(12) United States Patent
Akiyama

(10) Patent No.: US 9,117,391 B2
(45) Date of Patent: Aug. 25, 2015

(54) PORTABLE TERMINAL, AND OPERATION INTERVAL SETTING METHOD

(75) Inventor: Katsuhiko Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/587,402

(22) Filed: Aug. 16, 2012

(65) Prior Publication Data

US 2012/0313970 A1 Dec. 13, 2012

Related U.S. Application Data

(63) Continuation of application No. PCT/JP2010/052941, filed on Feb. 25, 2010.

(51) Int. Cl.
*G09G 5/00* (2006.01)
*G09G 3/20* (2006.01)
*G06F 3/01* (2006.01)
*G06F 3/0481* (2013.01)
*G06F 3/0346* (2013.01)
*G09G 5/32* (2006.01)

(52) U.S. Cl.
CPC ............... *G09G 5/006* (2013.01); *G06F 3/017* (2013.01); *G06F 3/0346* (2013.01); *G06F 3/0481* (2013.01); *G09G 3/20* (2013.01); *G09G 5/32* (2013.01); *G06F 2200/1614* (2013.01); *G06F 2200/1637* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,819,334 B1 * | 11/2004 | Owada et al. | 345/659 |
| 7,692,668 B2 | 4/2010 | Ahn | |
| 8,068,121 B2 * | 11/2011 | Williamson et al. | 345/659 |
| 8,098,981 B2 * | 1/2012 | Seo et al. | 345/659 |
| 8,120,625 B2 * | 2/2012 | Hinckley | 345/659 |
| 8,379,059 B2 * | 2/2013 | Shih et al. | 345/659 |
| 8,564,618 B2 * | 10/2013 | Ryu et al. | 345/629 |
| 8,860,765 B2 * | 10/2014 | Kilpatrick et al. | 345/659 |
| 2005/0104848 A1 | 5/2005 | Yamaguchi et al. | |
| 2005/0184955 A1 * | 8/2005 | Wong et al. | 345/156 |
| 2006/0185182 A1 | 8/2006 | Sato | |

(Continued)

FOREIGN PATENT DOCUMENTS

| | | |
|---|---|---|
| JP | 9-69023 A | 3/1997 |
| JP | 2000-111872 A | 4/2000 |

(Continued)

OTHER PUBLICATIONS

International Search Report of Corresponding PCT Application PCT/JP2010/052941 mailed Apr. 6, 2010.

(Continued)

*Primary Examiner* — Ryan R Yang
(74) *Attorney, Agent, or Firm* — Staas & Halsey LLP

(57) ABSTRACT

A disclosed portable terminal includes: an inclination measurement unit that measures an inclination of the portable terminal; a change unit that change a display direction of contents to be displayed on a display screen of the portable terminal according to a state of a user holding the portable terminal; an operation interval setting unit that sets an operation interval of the change unit based on change of the inclination over time, which was measured by the inclination measurement unit; and an operation controller that causes the change unit to operate at intervals that were set by the operation interval setting unit.

6 Claims, 6 Drawing Sheets

(56) References Cited

U.S. PATENT DOCUMENTS

| | | | |
|---|---|---|---|
| 2008/0259095 A1* | 10/2008 | Dubs et al. | 345/659 |
| 2009/0239579 A1 | 9/2009 | Lee et al. | |

FOREIGN PATENT DOCUMENTS

| | | |
|---|---|---|
| JP | 2003-186462 A | 7/2003 |
| JP | 2005-004210 A | 1/2005 |
| JP | 2005-100084 A | 4/2005 |
| JP | 2005-266061 A | 9/2005 |
| JP | 2006-234460 A | 9/2006 |
| JP | 2007-17596 A | 1/2007 |
| JP | 2008-177819 A | 7/2008 |
| JP | 2009-130816 A | 6/2009 |
| JP | 2009-267809 | 11/2009 |
| JP | 2011-138449 | 7/2011 |

OTHER PUBLICATIONS

Japanese Office Action mailed Aug. 19, 2014 in corresponding Japanese Patent Application No. 2014-008263.

U.S. Office Action mailed Jun. 19, 2015 in corresponding U.S. Appl. No. 14/178,766.

* cited by examiner

PORTABLE TERMINAL, AND OPERATION INTERVAL SETTING METHOD

CROSS-REFERENCE TO RELATED APPLICATIONS

This application is a continuing application, filed under 35 U.S.C. section 111(a), of International Application PCT/JP2010/052941, filed Feb. 25, 2010.

FIELD

This technique relates to a display control technique in a portable terminal.

BACKGROUND

A portable terminal such as a mobile telephone, a Personal Digital Assistant (PDA) or a smart phone often has a rectangular flat shape in order to make it easier for the user to hold and operate. Therefore, the shape of the display screen is also often rectangular. However, the shape of contents, such as a webpage, that are displayed in the display screen does not always match the shape of the display screen, so in some cases the contents may not be displayed properly. For example, when contents that are long in the horizontal direction are displayed in a case such as illustrated in FIG. 1 where the display screen is a rectangular shape that is long in the vertical direction of the portable terminal, part of the contents are not displayed on the display screen.

To solve this kind of problem, there is a technique for controlling the display direction of the contents. More specifically, information on the face of the user of the portable terminal is acquired based on an image that is taken by a camera provided in the portable terminal. Moreover, the relative positional relationship between the orientation of the user's face and the orientation of the portable terminal is found. The orientation of information that is displayed on the display screen of the portable terminal is then set according to the found positional relationship.

However, in order to monitor whether there is a change in the direction of the user's face, power is constantly supplied to the camera, and image analysis is constantly performed, so power consumption becomes extremely large. In the case of the portable terminal, shortening the amount of time that the battery can be continuously used is not preferred. However, when an attempt is made to decrease the power consumption by simply reducing the frequency of taking images and performing image analysis, there is a problem in that the response becomes slow.

Namely, in the conventional display control in the portable terminal, the power consumption cannot be reduced.

SUMMARY

This portable terminal relating to the technique includes: (A) an inclination measurement unit that measures an inclination of the portable terminal; (B) a change unit that changes a display direction of contents to be displayed on a display screen of the portable terminal according to a state of a user holding the portable terminal; (C) an operation interval setting unit that sets an operation interval of the change unit based on change of the inclination over time, which was measured by the inclination measurement unit; and (D) an operation controller that causes the change unit to operate at intervals that were set by the operation interval setting unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 2:
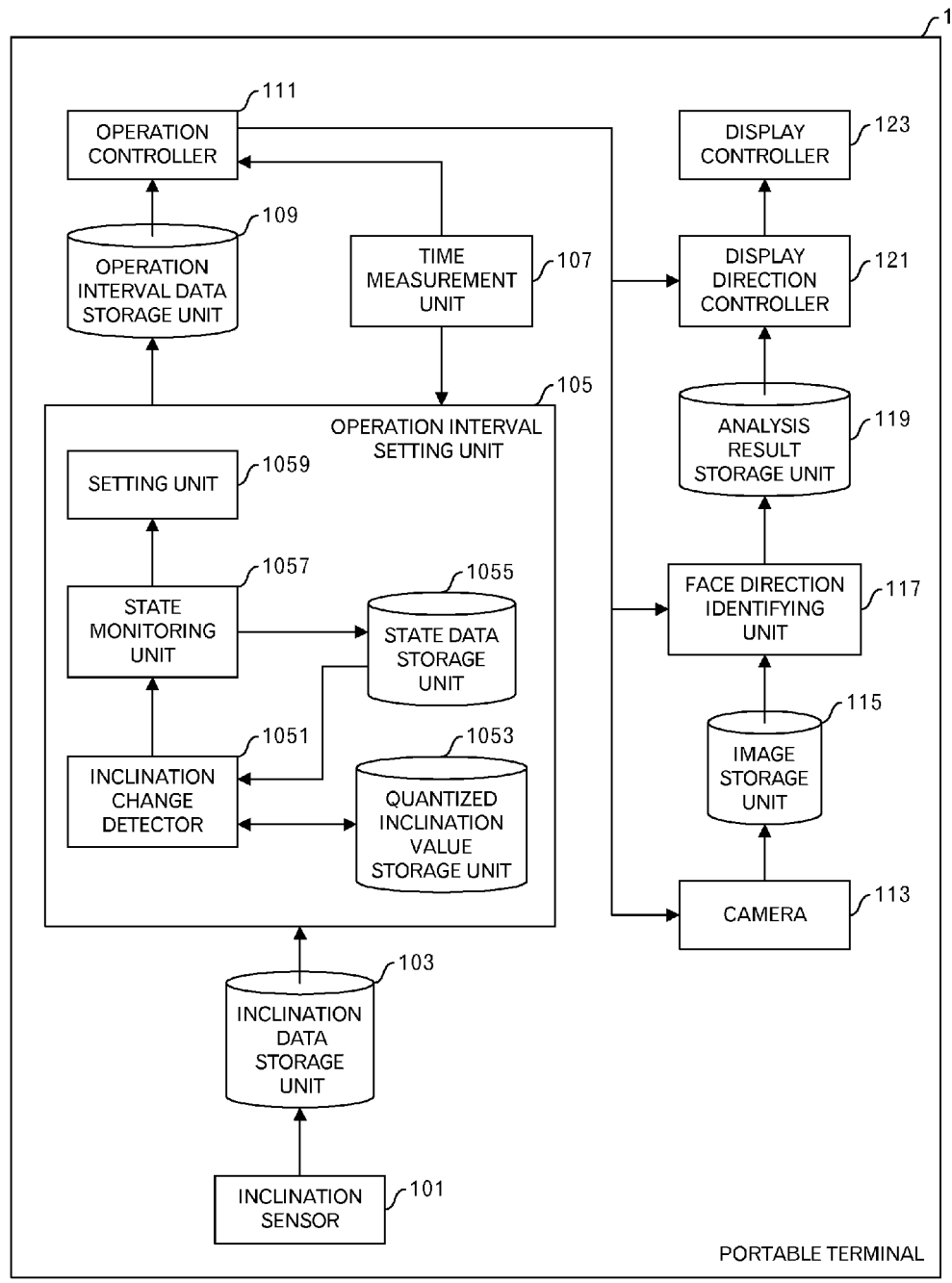
FIG. 2 is a functional block diagram relating to an embodiment of this technique.

FIG. 2 illustrates a functional block diagram of a portable terminal 1 relating to an embodiment of this technique. For example, the portable terminal 1, which is, for example, a mobile telephone, a PDA, a smart phone, a compact personal computer, or the like has an inclination sensor 101, an inclination data storage unit 103, an operation interval setting unit 105, a time measurement unit 107, an operation interval data storage unit 109, an operation controller 111, a camera 113, an image storage unit 115, a face direction identifying unit 117, an analysis result storage unit 119, a display direction controller 121 and a display controller 123. Moreover, the operation interval setting unit 105 has an inclination change detector 1051, a quantized inclination value storage unit 1053, a state data storage unit 1055, a state monitoring unit 1057 and a setting unit 1059.

The inclination sensor 101 measures the inclination of the portable terminal 1 and stores the result in the inclination data storage unit 103. The inclination change detector 1051 calculates the quantized inclination value based on the data stored in the inclination data storage unit 103, carries out a processing based on data that is stored in the quantized inclination value storage unit 1053 and state data storage unit 1055 and carries out a processing for notifying the state monitoring unit 1057 of the processing results. The state monitoring unit 1057 carries out a processing to update data stored in the state data storage unit 1055 and notify the setting unit 1059 when the data stored in the state data storage unit 1055 is updated. The setting unit 1059 determines the operation interval based on the notification from the state monitoring unit 1057, and stores the data of the operation interval in the operation interval data storage unit 109. The time measurement unit 107 outputs the time data to the operation interval setting unit 105 and the operation controller 111. The operation controller 111 controls the operation interval of the camera 113, face direction identifying unit 117 and display direction controller 121 based on the data stored in the operation interval data storage unit 109. The camera 113 takes an image of the user that is operating the portable terminal 1, and stores the image of the user in the image storage unit 115. The face direction identifying unit 117 analyzes the image stored in the image storage unit 115, identifies the relative direction of the user's face with respect to a predetermined direction of the portable terminal 1 and stores the analysis result in the analysis result storage unit 119. The display direction controller 121 identifies the display direction of the contents displayed on the display screen of the portable terminal 1 based on the data that is stored in the analysis result storage unit 119 and controls the display controller 123 so that the contents are displayed in the identified display direction. The display controller 123 changes the display direction of the contents that are displayed on the display screen of the portable terminal 1.

The inclination sensor 101 is an acceleration sensor, a terrestrial magnetic sensor, a gyro sensor or the like. The inclination sensor 101 measures the angle of inclination in two or more coordinate axes centered around the portable terminal as the inclination of the portable terminal 1. The inclination sensor 101 is controlled so that measurement is carried out at fixed intervals of about 20 milliseconds, for example.

The time measurement unit 107 measures the amount of time that has elapsed by increasing a counter value each time a predetermined time unit (for example, 10 milliseconds) elapses. A counter that includes a quartz oscillator may, for example, be used as the time measurement unit 107.

The camera 113 is an image sensor provided on the same surface of the portable terminal 1 as the display screen, such as a Complementary Metal Oxide Semiconductor (CMOS) image sensor, Charge-Coupled Device (CCD) or the like. Normally, when operating the portable terminal, the user looks at the display screen of the portable terminal, so the image of the user that is taken by the camera 113 naturally includes the area of the user's face.

The face direction identifying unit 117 identifies the position of the face on an image by carrying out face detection, and carries out a processing to identify the direction of the face. The face detection may be carried out by a method of comparing the characteristic patterns of the eyes, nose and mouth that are included in a skin colored area of the image with a reference pattern, and determining the face when those are in a predetermined positional relationship. A method for determining probability of the face by preparing a standard face pattern beforehand, and comparing that pattern with the skin-colored area in the image may be used. Moreover, a method for identifying the face direction may be a method, for example, for rotating the image a predetermined angle at a time and calculating the probability that the angle is the proper angle, and then identifying the angle having the highest probability as the face direction.

The display direction controller 121 identifies the display direction of the contents based on the analysis result concerning the face direction that is stored in the analysis result storage unit 119. For example, the display direction controller 121 determines the display direction so that the direction of the user's head in the image coincides with the upward direction of the contents. As a result, the contents are displayed in a favorable display direction for the user.

The inclination sensor 101, time measurement unit 107, camera 113, face direction identifying unit 117 and display direction controller 121 are conventionally known functions, so they will not be described in detail here.

Next, the operation of the portable terminal 1 illustrated in FIG. 2 will be explained using FIG. 3 to FIG. 7. First, an operation interval setting processing will be explained using FIG. 3 to FIG. 6, then a display direction control processing will be explained using FIG. 7.

Figure 1:
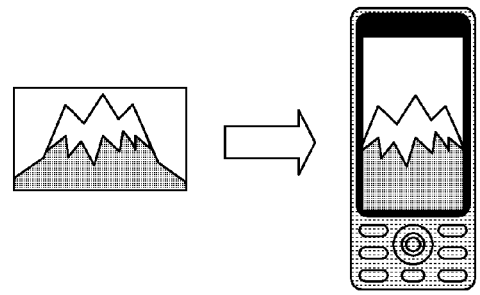
FIG. 1 is a diagram to explain a problem in a conventional art.
Figure 3:
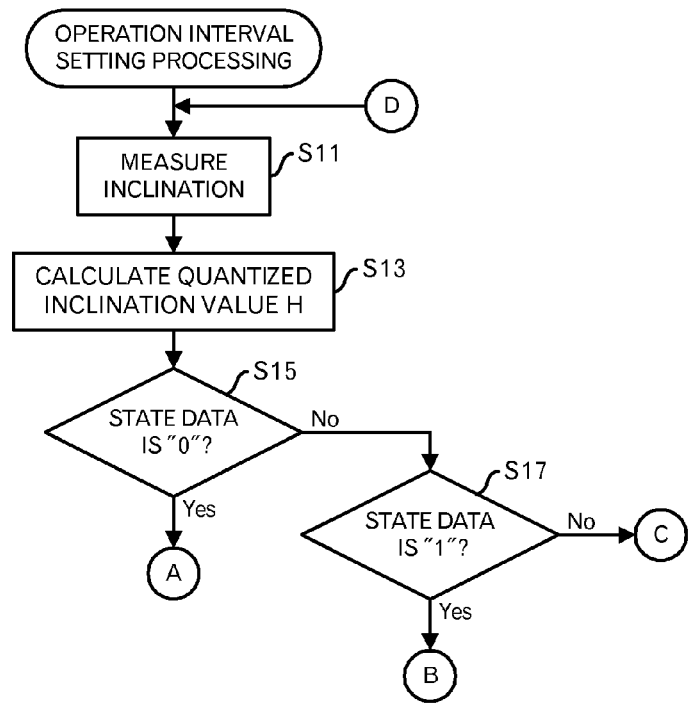
FIG. 3 is a diagram depicting a processing flow of an operation interval setting processing.

First, the inclination sensor 101 measures the inclination of the portable terminal 1, and stores the measurement value in the inclination data storage unit 103 (FIG. 3: step S11). Then, the inclination change detector 1051 calculates the quantized inclination value H from the inclination data that is stored in the inclination data storage unit 103, and stores the result in a memory device such a main memory (step S13).

Here, the quantized inclination value will be explained. In this embodiment, the direction in which the portable terminal 1 inclines with respect to the direction of gravity is identified from the inclination data that is stored in the inclination data storage unit 103, and then the quantized value of that identified direction is calculated. In this quantization, the four values "0", "1", "2" and "3" are used. When the direction of inclination of the portable terminal 1 is between 0 degree and 89 degrees, the quantized inclination value is "0", when the direction of inclination is between 90 degrees to 179 degrees, the quantized inclination value is "1", when the direction of inclination is between 180 degrees to 269 degrees, the quantized inclination value is "2", and when the direction of inclination is between 270 degrees to 359 degrees, the quantized inclination value is "3".

As will be described later, in this embodiment, change in the quantized inclination value is detected as an inclination change event. This is because in practical use, often when the display screen is inclined only a little, there is little need for the user to change the display direction.

Returning to the explanation of FIG. 3, the inclination change detector 1051 reads state data from the state data storage unit 1055, and determines whether or not that state data is "0" (step S15). The state data that is "0" expresses that the state of the portable terminal 1 is stable. When the state data is "0" (step S15: YES route), the processing moves to step S19 in FIG. 4 via a terminal A.

On the other hand, when the state data is not "0" (step S15: NO route), the inclination change detector 1051 determines whether or not the state data is "1" (step S17). The state data that is "1" represents a state immediately after an inclination change event was detected. When the state data is "1" (step S17: YES route), the processing moves to step S31 in FIG. 5 via a terminal B.

However, when the state data is not "1" (step S17: NO route), the state data is "2", so the processing moves to step S51 in FIG. 6 via a terminal C. The state data that is "2" represents that a predetermined amount of time has elapsed since an inclination event was detected.

Figure 4:
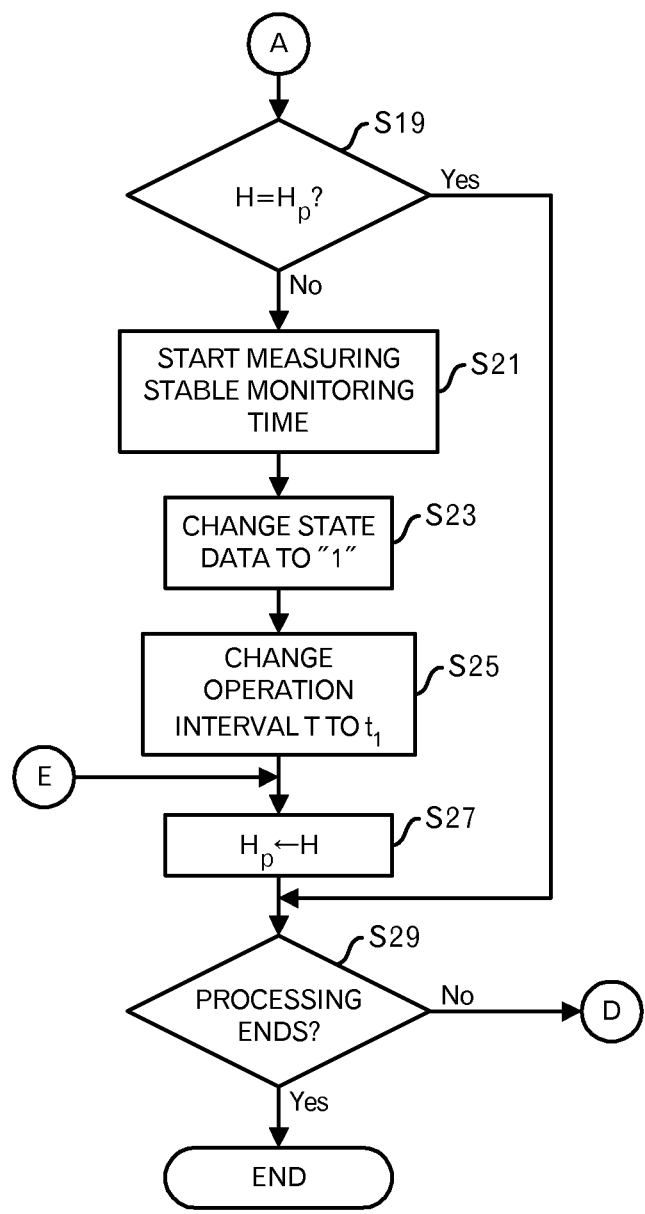
FIG. 4 is a diagram depicting a processing flow of an operation interval setting processing.

Moving to an explanation of FIG. 4, the inclination change detector 1051 reads the quantized inclination value $H_p$ from the quantized inclination value storage unit 1053, and determines whether that value is equal to the quantized inclination value H that was calculated at the step S13 (step S19). The quantized inclination value $H_p$ is the previously calculated quantized inclination value. At the step S19, whether or not an inclination change event occurred is determined by comparing the quantized inclination values.

When $H_p$ is equal to H (step S19: YES route), the processing moves to step S29. However, when $H_p$ is not equal to H (step S19: NO route), the inclination change detector 1051 notifies the state monitoring unit 1057 that an inclination change event was detected. The state monitoring unit 1057 then causes the time measurement unit 107 to measure the stable monitoring time (step S21). The stable monitoring time is the time for determining whether the state of the portable terminal 1 is stable.

Next, the state monitoring unit 1057 changes the state data that is stored in the state data storage unit 1055 from "0" to "1" (step S23). This is because an inclination change event was detected, and the state is not a stable state. Also, at the step S23, the state monitoring unit 1057 notifies the setting unit 1059 that the state data was changed from "0" to "1". The setting unit 1059 then changes the operation interval T that is stored in the operation interval data storage unit 109 to $t_1$ (step S25). In this embodiment, when the state data is "0", the operation interval T is supposed to be already set to $t_1$, so the step S25 may be skipped.

Here, the operation interval T will be explained. In this embodiment, either $t_1$, which is set as the operation interval T when it is desired to suppress the amount of electric power consumed, or $t_2$, which is set as the operation interval T when it is desired to frequently carry out control of the display direction, is used. Here, $t_1$ is longer than $t_2$, however, $t_1$ may be taken to be infinity (in other words, operation is not carries out). By using such $t_1$ in this way, display direction control is hardly carried out (or is not carried out at all) when the user uses the portable terminal 1 in the same position for a long time without passing the portable terminal 1 from one hand to the other, so it is possible to greatly reduce power consumption. On the other hand, by setting $t_2$ as an interval of about 20 to 200 ms, the user is able to obtain a nearly instantaneous response.

In this embodiment, when the state data is "0", $t_1$ is set as the operation interval T. The state of the portable terminal 1 is stable, so this is for suppressing the power consumption by lowering the frequency that control of the display direction is carried out. Even when the state data is "1", $t_1$ is set as the operation interval T. This is because the state of the portable terminal 1 is not stable, and even though the display direction is changed, there is a possibility that the direction will have to be changed again soon, so increasing the frequency that display direction control is carried out is not efficient. When the state data is "2", $t_2$ is set as the operation interval T. The state of the portable terminal 1 becomes stable, so this is for making it possible to change the display direction quickly by shortening the operation interval T.

Returning to the explanation of FIG. 4, the inclination change detector 1051 changes the quantized inclination value that is stored in the quantized inclination value storage unit 1053 to the quantized inclination value that was calculated at the step S13 (step S27). Then, when the processing is not supposed to end yet (step S29: NO route), the processing returns to the processing of the step S11 via a terminal D. When the processing is supposed to end (for example, when an instruction to end or stop the processing is given) (step S29: YES route), the processing ends.

Figure 5:
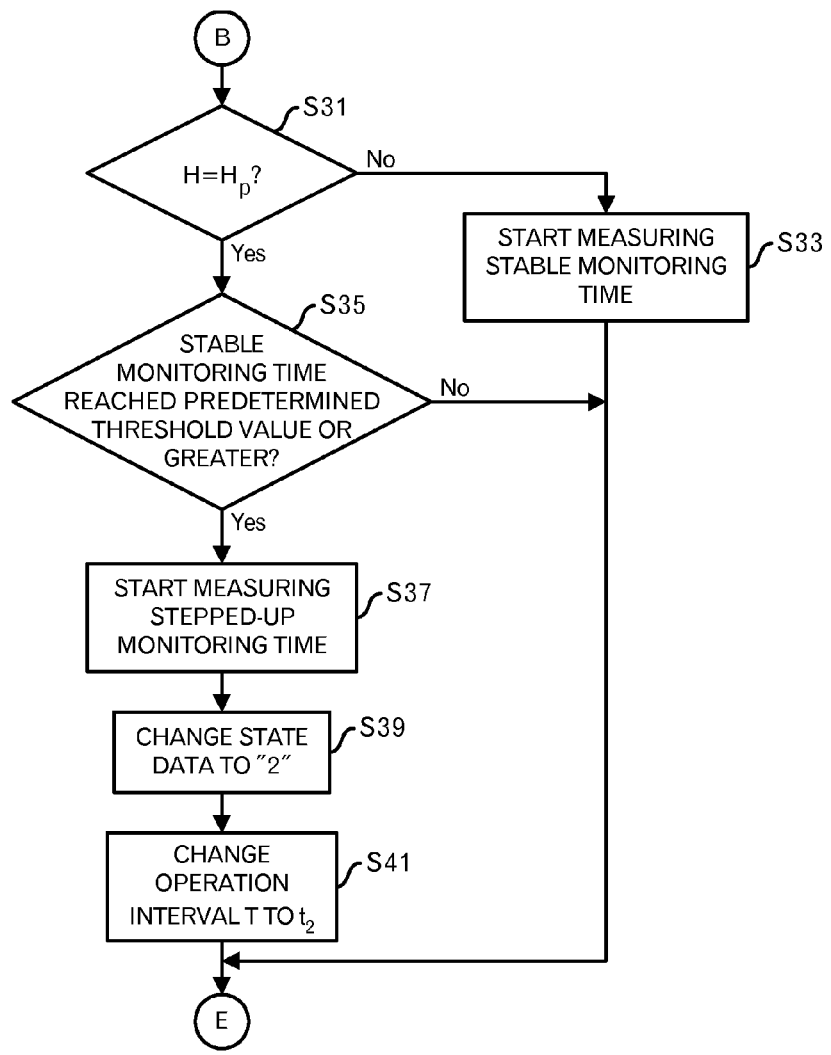
FIG. 5 is a diagram depicting a processing flow of an operation interval setting processing.

Next, moving to an explanation of FIG. 5, the inclination change detector 1051 reads the quantized inclination value $H_p$ from the quantized inclination value storage unit 1053, and determines whether the read value is equal to the quantized inclination value H that was calculated at the step S13 (step S31). When $H_p$ is not equal to H (step S31: NO route), an inclination change event was detected, so the inclination change detector 1051 notifies the state monitoring unit 1057 that an inclination change event was detected. Then, the state monitoring unit 1057 causes the time measurement unit 107 to start measuring the stable monitoring time (step S33). The processing then moves to the step S27 in FIG. 4 via a terminal E.

On the other hand, when $H_p$ is equal to H (step S31: YES route), the inclination change detector 1051 notifies the state monitoring unit 1057 that an inclination change event is not detected. The state monitoring unit 1057 then determines whether the stable monitoring time that is being measured by the time measurement unit 107 has reached a predetermined threshold value or greater (step S35). When the stable monitoring time does not reach the predetermined threshold value or greater (step S35: NO route), the state of the portable terminal 1 is considered to be unstable, yet. Therefore, the processing moves to the step S27 in FIG. 4 via the terminal E.

On the other hand, when the stable monitoring time is equal to or greater than a predetermined threshold value (step S35: YES route), the state of the portable terminal 1 is considered to be stable, so the state monitoring unit 1057 causes the time measurement unit 107 to start measuring the stepped-up monitoring time (step S37). During the stepped-up monitoring time, the frequency that display direction control is carried out increases so it is possible to quickly carry out display direction control for change in the user's state.

Then, the state monitoring unit 1057 changes the state data that is stored in the state data storage unit 1055 from "1" to "2" (step S39). This is because the state of the portable terminal 1 is regarded to be stable. Also, at the step S39, the state monitoring unit 1057 notifies the setting unit 1059 that the state data has been changed from "1" to "2". The setting unit 1059 then changes the operation interval T that is stored in the operation interval data storage unit 109 from $t_1$ to $t_2$ (step S41). In other words, the operation interval is shortened. The processing then moves to the step S27 in FIG. 4 via the terminal E.

Figure 6:
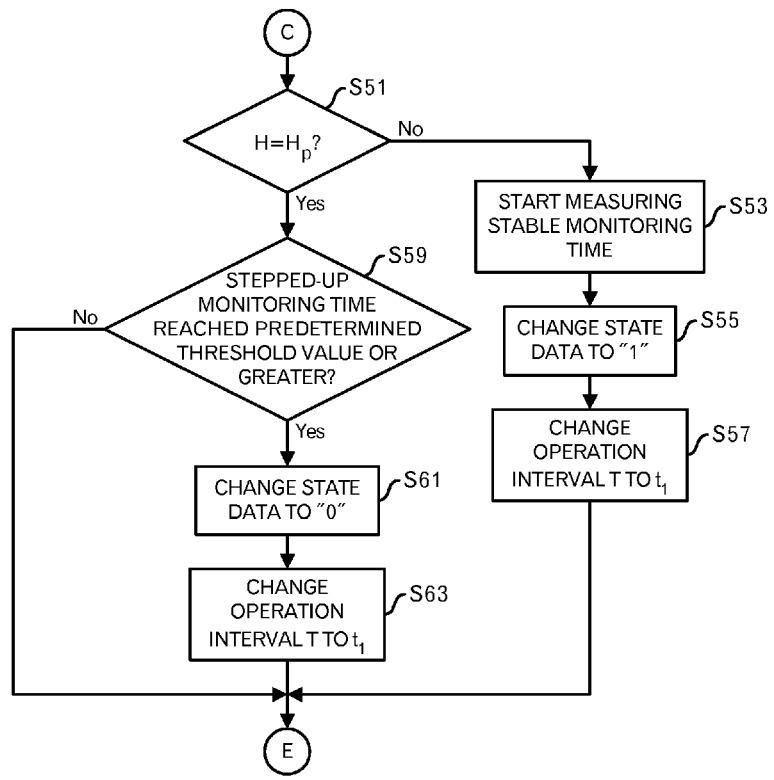
FIG. 6 is a diagram depicting a processing flow of an operation interval setting processing.

Next, moving to an explanation of FIG. 6, the inclination change detector 1051 reads the quantized inclination value $H_p$ from the quantized inclination value storage unit 1053, and determines whether that value is equal to the quantized inclination value H that was calculated at the step S13 (step S51). When $H_p$ is not equal to H (step S51: NO route), an inclination change event has been detected, so the inclination change detector 1051 notifies the state monitoring unit 1057 that an inclination change event was detected. Then, the state monitoring unit 1057 causes the time measurement unit 107 to start measuring the stable monitoring time (step S53).

The state monitoring unit 1057 then changes the state data that is stored in the state data storage unit 1055 from "2" to "1" (step S55). Also, at the step S55, the state monitoring unit 1057 notifies that setting unit that the state data has been changed from "2" to "1". The setting unit 1059 then changes the operation interval T that is stored in the operation interval data storage unit 109 from $t_2$ to $t_1$ (step S57). In other words, the operation interval is lengthened in order to suppress the power consumption. The processing then moves to the step S27 in FIG. 4 via the terminal E.

On the other hand, when $H_p$ is equal to H (step S51: YES route), the inclination change detector 1051 notifies the state monitoring unit 1057 that an inclination change event was not detected. The state monitoring unit 1057 then determines whether the stepped-up monitoring time being measured by the time measurement unit 107 has reached a predetermined threshold value or greater (step S59). When the stepped-up monitoring time does not reach the predetermined threshold value or greater (step S59: NO route), the processing moves to the step S27 in FIG. 4 via the terminal E.

However, when the time is equal to or greater than the predetermined threshold value (step S59: YES route), the state monitoring unit 1057 changes the state data that is stored in the state data storage unit 1055 from "2" to "0" (step S61). Also, at the step S61, the state monitoring unit 1057 notifies the setting unit 1059 that the state data has been changed from "2" to "0". The setting unit 1059 then changes the operation interval T that is stored in the operation interval data storage unit 109 from $t_2$ to $t_1$ (step S63). In other words, the operation interval is lengthened. This is because it is not necessary to carry out display direction control very frequently, so power consumption is reduced by lengthening the operation interval. The processing then moves to the step S27 in FIG. 4 via the terminal E.

By carrying out the processing described above, it is possible to set a suitable operation interval that makes it possible to maintain quick response and reduce power consumption during display direction control of a portable terminal.

Figure 7:
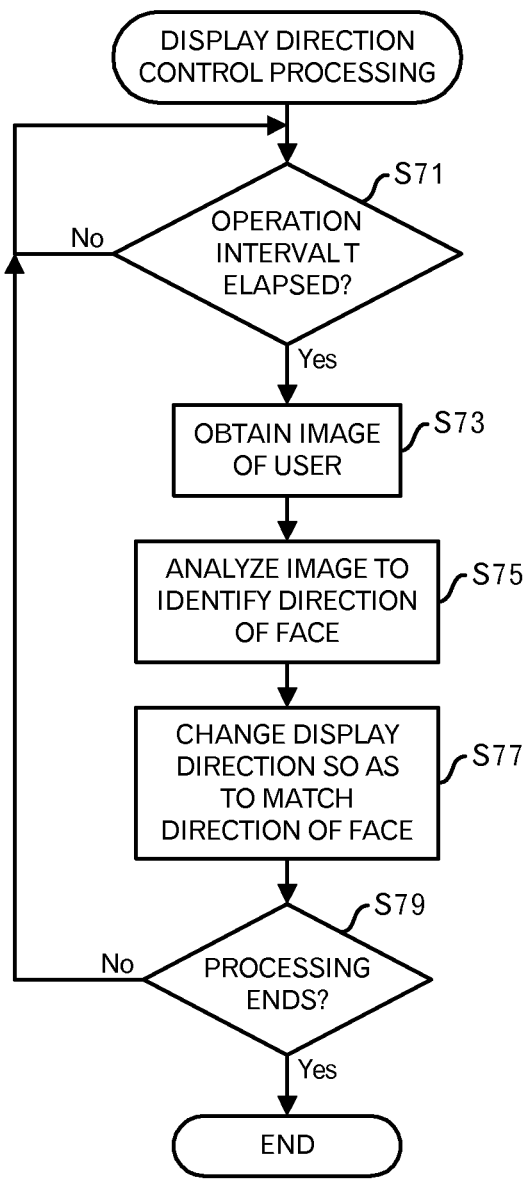
FIG. 7 is a diagram depicting a processing flow of a display direction control processing.

Next, the display direction control processing will be explained using FIG. 7. First, the operation controller 111 determines whether the elapsed time that was measured by the time measurement unit 107 has exceeded the operation interval T that is stored in the operation interval data storage unit 109 (step S71). When the elapsed time has not exceeded the operation interval time T (step S71: NO route), the processing of the step S71 is repeated.

However, when the elapsed time has exceeded the operation interval T (step S71: YES route), the operation controller 111 carries out control so as to start operation of the camera 113, face direction identifying unit 117 and display direction controller 121. As a result, the camera 113 takes an image of the user that is operating the portable terminal 1, and stores the image of the user in the image storage unit 115 (step S73). Moreover, the face direction identifying unit 117 analyzes the image stored in the image storage unit 115 and identifies the relative direction of the user's face with respect to a predetermined direction of the portable terminal 1, then stores the analysis result in the analysis result storage unit 119 (step S75). Furthermore, the display direction controller 121 identifies the display direction of the contents based on the data stored in the analysis result storage unit 119, and controls the display controller 123 so that the contents are displayed in the identified display direction (step S77).

The operation controller 111 then determines whether the processing is to be ended (step S79). When the processing is not to be ended (step S79: NO route), the operation controller 111 instructs the time measurement unit 107 to start measuring the time, and the processing returns to the step S71. On the other hand, when the processing is to be ended (for example, when an instruction to end or stop processing is given) (step S79: YES route), the operation controller 111 ends the processing.

By carrying out the processing described above, it is possible to reduce the power required for controlling the display direction.

Although an embodiment of this technique was explained above, this technique is not limited to the embodiment. For example, the functional block diagram of the aforementioned portable terminal 1 does not always correspond to an actual program module configuration.

Moreover, in the aforementioned processing, an order of steps may be exchanged as long as the processing results do not change. Furthermore, they may be executed in parallel.

Moreover, an example that four values from 0 to 3 are used as the quantized inclination value is explained above. However, values that are more or less than 4 values may be used.

Furthermore, a processing may be carried out without using the quantized inclination values. For example, a configuration may be adopted that the inclination is held when the display direction control was lastly conducted, and the inclination change event is detected when the inclination being held changes by a predetermined value or more.

Moreover, when the image of the user does not include the area of the face, the display direction control may be carried out based on the inclination measured by the inclination sensor 101. The portable terminal using such a technique is well-known. Therefore, further explanation is omitted.

Moreover, when it takes a long time for the setup of the camera 113, initialization or the like, the camera 113 may be always operating, and the operation intervals of the face direction identifying unit 117 and display direction controller 121 may be controlled.

Figure 8:
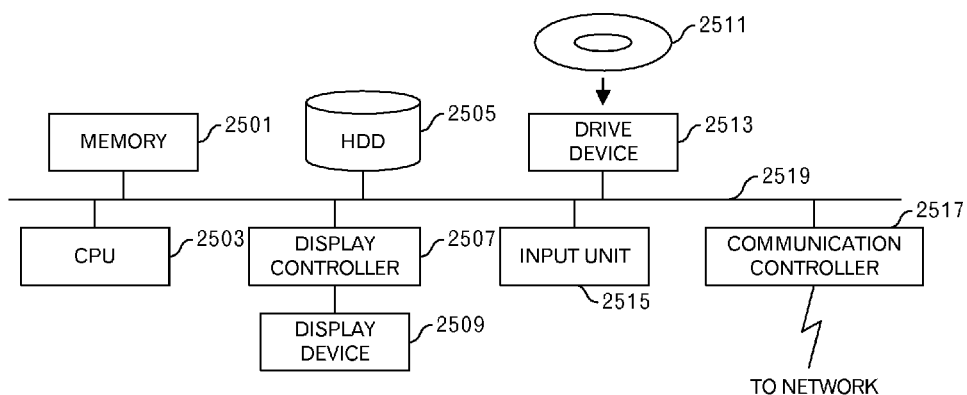
FIG. 8 is a functional block diagram of a computer.

As illustrated in FIG. 8, the portable terminal 1 is a device in which a memory 2501 (storage unit), CPU 2503 (processor), hard disk drive (HDD) 2505, a display controller 2507 connected to a display device 2509, drive device 2513 for a removable disk 2511, input device 2515, communication controller 2517 to connect with a network, sensors 2521 are connected to a bus 2519. An Operating System (OS) and control program for carrying out the processing in this embodiment are stored in the HDD 2505, and when being executed by the CPU 2503, they are read from the HDD 2505 to the memory 2501. If necessary, the CPU 2503 controls the sensors 2521 (inclination sensor and camera, and maybe time measurement unit and the like) to obtains necessary measurement values, and controls the display controller 2507, drive device 2513 and communication controller 2517 to conduct necessary operations. Moreover, data in the processing is stored in the memory 2501 and stored in the HDD 2505, if necessary. Such a computer realizes the aforementioned various functions by organically cooperating the hardware such as the CPU 2503 and memory 2501 with the control program and OS.

The aforementioned embodiment is summarized as follows:

A portable terminal relating to the embodiment includes: (A) a tilt measurement unit that measures a tilt of the portable terminal; (B) a change unit that change a display direction of contents to be displayed on a display screen of the portable terminal according to a state of a user holding the portable terminal; (C) an operation interval setting unit that sets an operation interval of the change unit based on change of the tilt over time, which was measured by the tilt measurement unit; and (D) an operation controller that causes the change unit to operate at intervals that were set by the operation interval setting unit.

Thus, by dynamically setting the operation interval, it becomes possible to reduce the power consumed by the change unit.

Moreover, the aforementioned change unit may include an image obtaining unit that obtains an image of a user holding the portable terminal; a direction identifying unit that analyzes the image obtained by the image obtaining unit to identify a relative direction of a user's face included in the image with respect to a predetermined direction of the portable terminal; and a display direction controller that changes a display direction of the contents to be displayed on the display screen according to the relative direction of the user's face identified by the direction identifying unit. This utilizes a matter that a display direction preferable to the user can be identified when the relative direction of the user's face is identified.

Furthermore, the aforementioned operation interval setting unit may have a detector that detects a tilt change event when the tilt measured by the tilt measurement unit is changed a predetermined value or more; a state monitoring unit that monitors whether or not another tilt change event is detected before a first time period elapses after the tilt change event was detected; and a setting unit that shortens the operation interval by a predetermined time, if the tilt change event was not detected even when the first time period elapsed. It is not efficient that the display direction is frequently changed when the tilt is not stable, and the electric power is wastefully consumed. Therefore, the operation interval is shortened after the tilt becomes stable.

In addition, when another tilt change event was not detected even when the first time period elapsed, the aforementioned monitoring unit may monitor whether another tilt change event is detected before a second time period elapses after the first time period elapsed, and when another tilt change event is not detected even when the second time period elapsed, the aforementioned setting unit may restore the operation interval to an original operation interval. By restoring the operation interval to the original operation interval when it becomes unnecessary to frequently operate the change unit, the power consumption is reduced.

Furthermore, when another tilt change event was detected before the second time period elapses, the aforementioned setting unit may restore the operation interval to the original operation interval, and the aforementioned state monitoring unit may monitor again whether the tilt change event is detected before the first time period elapses after another tilt change event was detected. When the tilt is not stable, the operation interval is restored to the original operation interval in order to reduce the power consumption.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A portable terminal, comprising:
an inclination measurement unit that measures an inclination of the portable terminal;
a memory; and
a processor configured to use the memory and execute a process, the process comprising:
detecting an inclination change that the inclination, which was measured by the inclination measurement unit, was changed a predetermined value or more;
after the inclination change was detected, monitoring whether another inclination change occurs before a first time period elapses;
shortening an interval by a predetermined time upon detecting that no other inclination change occurs even when the first time period elapsed; and
changing a display direction of contents to be displayed on a display screen of the portable terminal according to a state of a user holding the portable terminal at intervals shortened by the shortening.

2. The portable terminal as set forth in claim 1, wherein the changing comprises:
obtaining an image of the user holding the portable terminal;
analyzing the obtained image to identify a relative direction of a user's face included in the obtained image with respect to a predetermined direction of the portable terminal; and
changing the display direction of the contents to be displayed on the display screen of the portable terminal according to the identified relative direction of the user's face.

3. The portable terminal as set forth in claim 1, wherein the shortening comprises:
upon detecting that no inclination change occurred even when the first time period elapsed, monitoring whether another inclination change occurs before a second time period elapses after the first time period elapsed; and
upon detecting no inclination change occurred even when the second time period elapsed, restoring the interval to an original interval.

4. The portable terminal as set forth in claim 3, wherein the shortening comprises:
upon detecting that the another inclination change occurred before the second time period elapses, restoring the interval to the original interval; and
monitoring whether an inclination change occurs again before the first time elapses after occurrence of the another inclination change was detected.

5. An interval setting method, comprising:
measuring, by using a portable terminal, an inclination of the portable terminal;
detecting, by using the portable terminal, an inclination change that the inclination was changed a predetermined value or more;
after the inclination change was detected, monitoring, by using the portable terminal, whether another inclination change occurs before a first time period elapses;
shortening, by using the portable terminal, an interval by a predetermined time upon detecting that no other inclination change occurs even when the first time period elapsed; and
changing, by using the portable terminal, a display direction of contents to be displayed on a display screen of the portable terminal according to a state of a user holding the portable terminal at intervals shortened by the shortening.

6. A computer-readable, non-transitory storage medium storing a program for causing a portable terminal to execute a process, the process comprising:
measuring an inclination of the portable terminal;
detecting that an inclination change that the inclination was changed a predetermined value or more;
after the inclination change was detected, monitoring whether another inclination change occurs before a first time period elapses;
shortening an interval by a predetermined time upon detecting that no other inclination change occurs even when the first time period elapsed; and
changing a display direction of contents to be displayed on a display screen of the portable terminal according to a state of a user holding the portable terminal at intervals shortened by the shortening.

* * * * *